Patented May 9, 1933

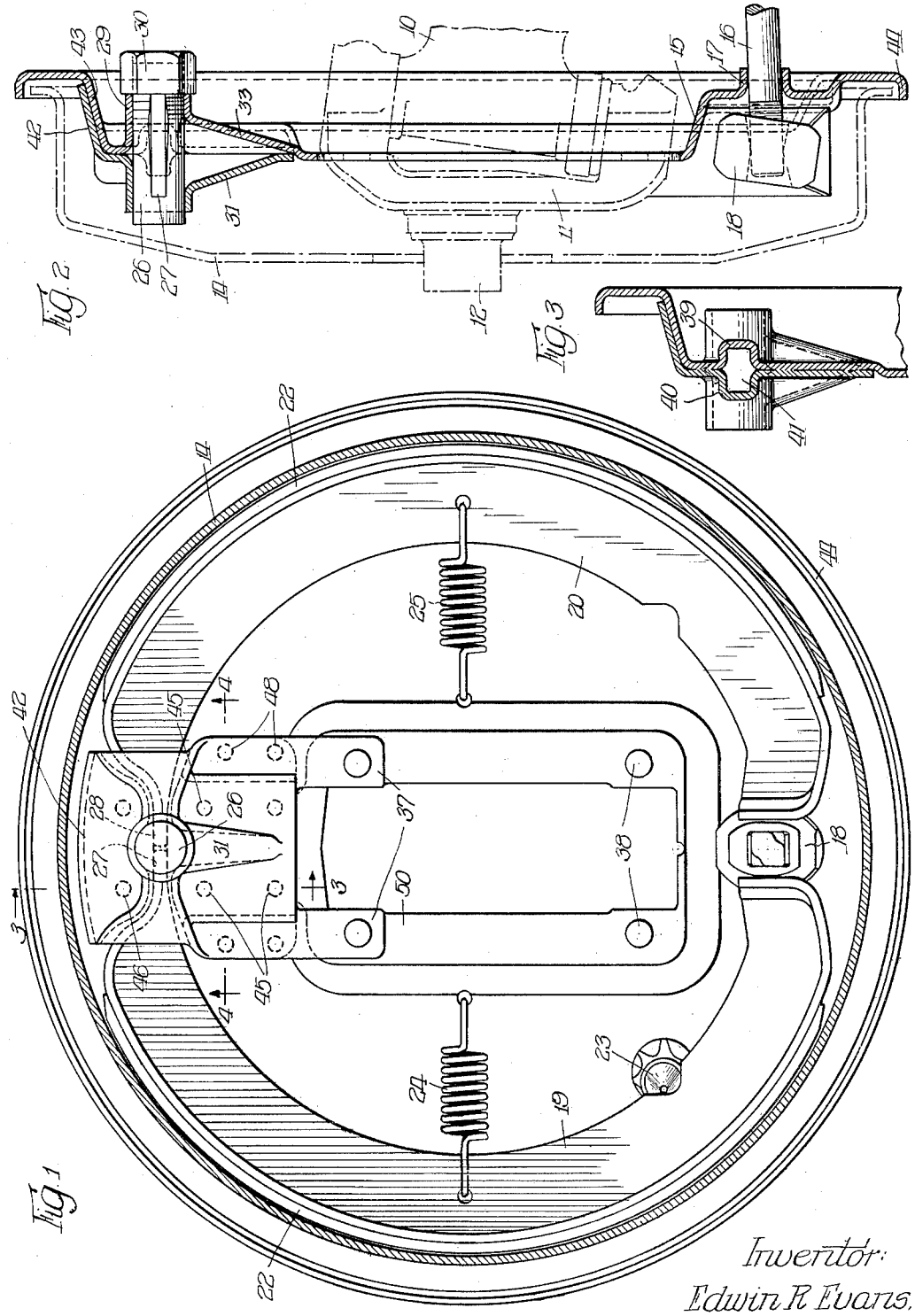

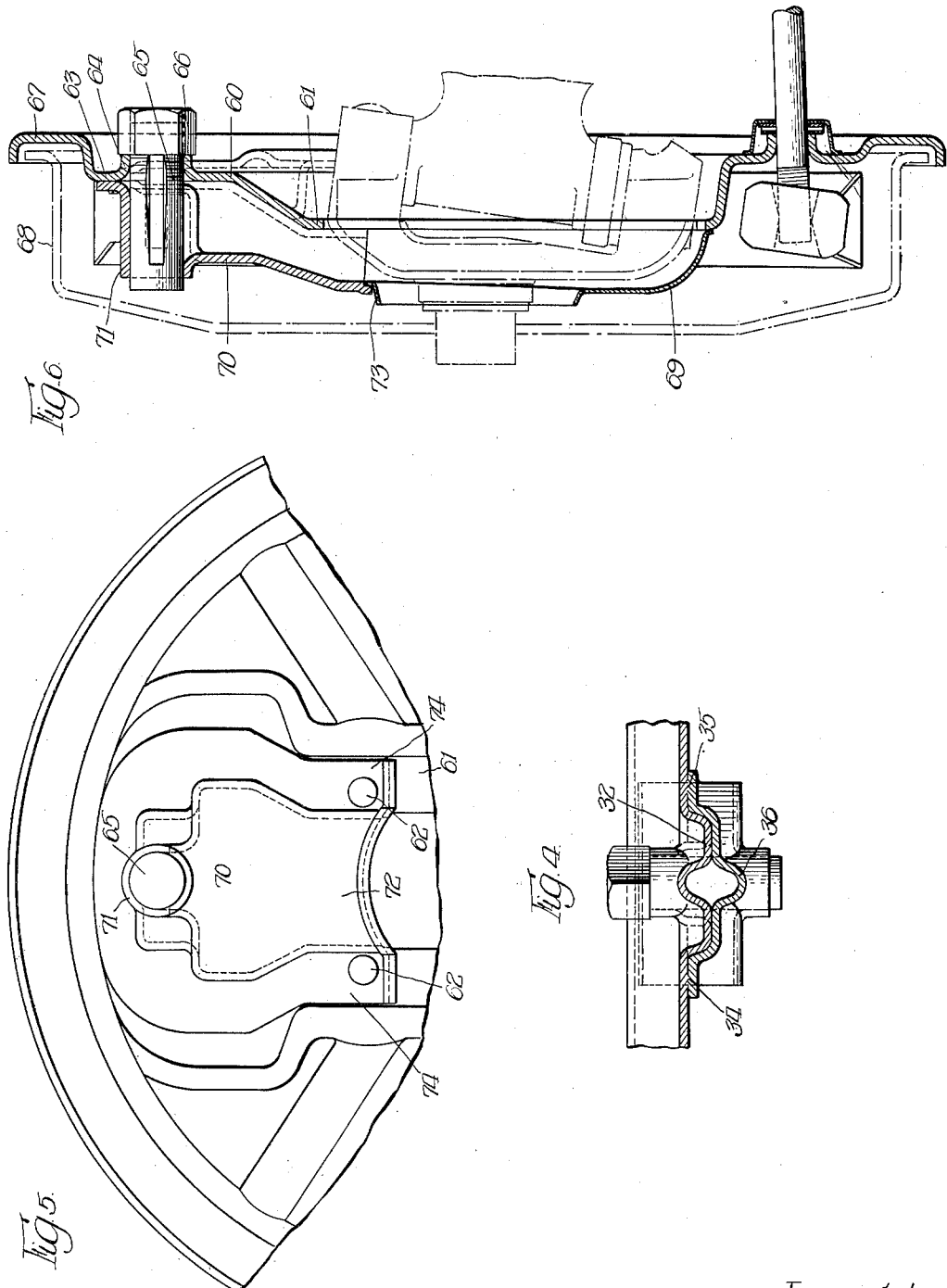

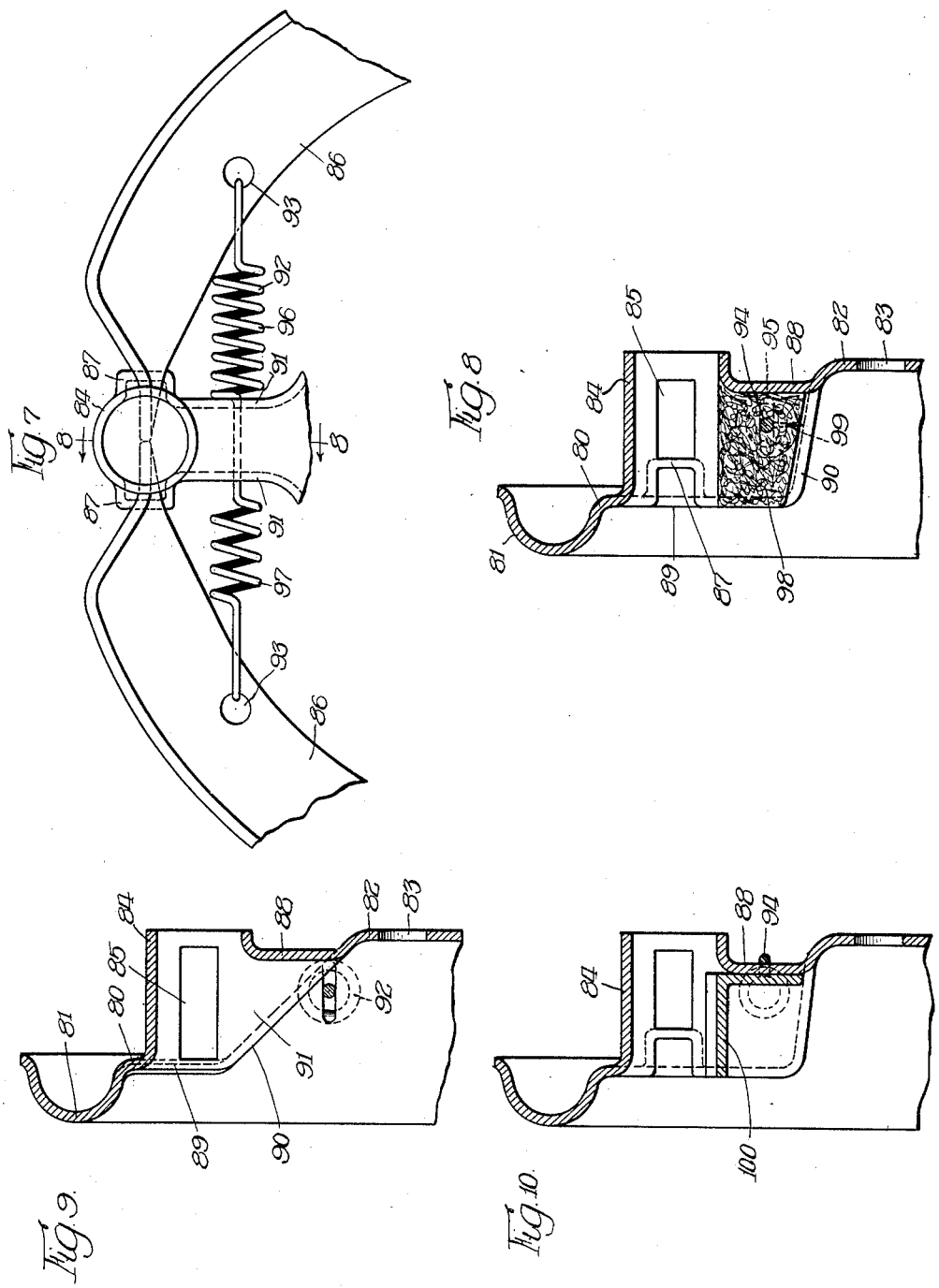

1,908,013

UNITED STATES PATENT OFFICE

EDWIN R. EVANS, OF CHICAGO, ILLINOIS

BRAKE

Application filed March 18, 1931. Serial No. 523,408.

This invention relates to improvements in brake construction and particularly to improvements in the construction of the supporting means for the pivot pin or anchor pin for the brake shoes in which the anchor pin may be an adjusting member for the brake shoes and is carried by cooperating portions of a backing plate or anchor plate and a bracket which is welded or otherwise secured thereto.

It has previously been proposed to support the anchor pin of a wheel brake for motor vehicles by the backing plate in which a bracket attached to the anchor plate assists in supporting the anchor pin but in the prior constructions the support for the pin has been laterally offset with respect to the median plane of the brake shoes whereby an unequal thrust subjected to the anchor pin, due to the actuation of the brake, resulted in a bending moment upon the pin.

It is an object of the present invention to provide a construction in which the anchor pin is guided and supported at one end by the anchor plate and at the other end by a bracket which is rigidly secured to the anchor plate in the median plane of the brake shoes.

It is further an object of the present invention to provide an improved formation of the anchor plate and supporting bracket for the anchor pin in which the anchor plate and bracket have cooperating portions tending to resist circumferential forces subjected to the anchor pin.

It is an additional object of the present invention to provide an extension from the bracket so that both may be secured together to a rigid support, such as the steering knuckle of a front wheel.

It is further an object of the present invention to so form the anchor plate and bracket which is secured thereto that they form a housing having lateral openings which receive the ends of the brake shoes.

Additional features of the construction will be more fully described in connection with the foregoing description taken in connection with the attached drawings, in which two embodiments of the invention are disclosed.

Figure 1 is a plan view of the assembled brake showing the brake drum in section;

Figure 2 is a vertical section taken on the plane indicated 2—2 in Figure 1 and illustrating the axle, steering knuckle and brake drum diagrammatically;

Figure 3 is a detail section taken on the plane indicated 3—3 in Figure 1;

Figure 4 is a detail horizontal section taken on the plane indicated 4—4 of Figure 1, and looking upwardly;

Figure 5 is a partial plan view of a modified construction of the anchor bracket;

Figure 6 is a vertical section corresponding to Figure 2 illustrating a modified construction;

Figure 7 is a partial elevation showing the association of a pair of brake shoes with a further modification of the anchor plate;

Figure 8 is a detail section of the anchor plate taken on the plane indicated 8—8 in Figure 7;

Figure 9 is a vertical section similar to Figure 8 showing a further modification, and Figure 10 is another vertical section similar to Figures 8 and 9 showing a still further modification.

In the drawings, the improved construction of the brake and particularly the improvements in the anchoring means for the brake shoes are shown in connection with a front wheel brake of a motor vehicle, but it will be obvious that the improvements are equally applicable to a rear wheel brake or other types of brakes. The front axle is diagrammatically indicated 10 having swivel bearings for the steering knuckle 11 having a wheel axle 12. The brake drum, which turns with the wheel, is indicated 14.

The anchor or backing plate generally indicated 15 is a stamp plate of novel formation, the improved features of which will be more particularly pointed out in the subsequent description. A cam operating shaft 16 is provided, preferably pivotally carried by the axle and extending through an opening 17 of the anchor plate. The end of the shaft is of square formation to fit within a cam 18. The cam is supported with its axis of rotation perpendicular to the swiveling axis of the front wheel and the internal squared-opening of the cam is therefore formed to enlarge in a vertical direction from outwardly from the center thereof so that the axis of the cam may be angular with respect to the axis of the operating shaft. The details of this construction are not claimed in the present application and therefore a full description of the cam construction is not required.

The cam 18 engages on opposite sides the inturned ends of a pair of brake shoes 19 and 20, each of which is formed from a single piece of metal. The brake shoes have the usual fabric friction lining secured to their exterior faces, as indicated 22. Member 23 is a centralizer extending from the anchor plate for adjusting the brake shoes together with the cam. The brake shoes are held in normal positions, out of engagement with the brake drum, by the tension springs 24—25, each of which extend between one of the shoes and the anchor plate. Adjustment and anchorage of the shoes are obtained by means of a slidable adjusting member or anchor pin 26, having inclined slots 27 on its opposite sides adapted to receive the ends 28 of the brake shoes. The member 26 extends through a pressed-out bearing 29 of the anchor plate and threadedly receives, on its protruding end, an adjusting nut 30. Turning of the nut 30 will cause the shoes to be moved close to, or farther from, the brake drum.

The particular improvements of the present application reside in the improved manner of housing the anchored ends of the brake shoes and the improved construction for supporting the adjusting anchor pin.

If the anchor pin is braced at one end only at a plane offset from the median plane of the brake shoes, it will be obvious that a considerable bending moment is imparted to the anchor pin when the brake shoes are forced into engagement with the rotating brake drum, since one shoe will tend to move with the drum away from the anchor pin, thereby increasing the thrust upon the actuating cam while the other shoe will be moved by the brake drum in a direction to impart a greater thrust to the anchor pin and the unequal pressure upon the opposite sides of the anchor pin will tend to twist the anchor pin with respect to its bearing mounting.

It is a feature of the present invention that the adjusting anchor pin is rigidly supported at both ends on opposite sides of the median plane of the brake shoes. Therefore, there is shown in Figures 1 and 2, a separately formed bracket 31 which is adapted to be welded to the anchor plate. Just below the anchor pin the anchor plate is pressed out towards the brake drum, as indicated at 32 in Figure 4, except for a portion indicated 33 which forms an inclined bracing support for the annular pressed-out bearing 29. The bracket 31 is formed to fit upon and overlap the pressed-out portion 32 of the anchor plate and includes overlapping side flanges 34—35, as shown in Figure 4. The central portion of the bracket forms an inclined brace 36, corresponding to the brace 33. The surface of the pressed-out portion 32 of the anchor plate to which the bracket is secured, lies substantially in the median plane of the brake shoes and in the plane of the central attaching portion 37 having a rectangular opening cut therein and having bolt-receiving openings 38. The anchor plate and bracket having complementary pressed-out portions 39 and 40 on opposite sides, as shown in Figure 3, forming lateral openings 41 to admit the ends of the brake shoes into engagement with the anchor pin. The top portion of the bracket includes a flange 42 for overlapping a conical portion 43 of the anchor plate, the peripheral edge of which is bent over as at 44, to overlap the brake drum.

The dotted circles 45 indicate points at which the bracket is welded to the pressed-out portion 32 of the anchor plate below the anchor pin and the dotted circles 46 indicate similar welding points above the anchor pin. Dotted circles 48 indicate additional welding points between the flanges 34 and 35 of the bracket and the anchor plate. It will therefore be obvious that the bracket is attached to the anchor plate above and below the anchor pin at points substantially in the median plane of the brake shoes. Therefore, an unequal thrust applied to the anchor pin, due to expansion of the brake shoes, will not result in a bending moment upon the anchor pin tending to separate the bracket from the anchor plate. Instead the unequal thrust will tend to shear the points at which the parts are welded together. The shearing force will be resisted in part by the overlapping portions of the bracket and anchor plate.

The bracket may have additional extensions 50 overlapping the rectangular attaching flange of the anchor plate and through which it is fastened to lugs on the steering knuckle so that the same bolts will hold the bracket as well as the anchor plate.

Figures 5 and 6 illustrate a somewhat modified construction in which an anchor plate 60 is formed with a vertical portion 61 having bolt-receiving openings 62 for attachment to the steering knuckle and a portion 63 in a vertical plane, which has an annular bearing 64 pressed out therefrom forming a support for one end of the anchor pin 65 and a stop for the adjusting nut 66. The anchor plate also includes an annular portion 67 which overlaps the edge of the brake drum 68. In this form a separate piece 69 is used as an oil sealing member covering the lower portion of the knuckle, although this piece may be made integral with the anchor bracket, if so desired. A bracket 70 is shown welded to the anchor plate in a manner similar to the bracket shown in the first form of the invention. The bracket 70 has an annular portion 71 forming a bearing support for the anchor pin 65 and includes a pressed-out portion 72 overlapping the upper portion of the knuckle and engaging the upper portion 73 of the oil sealing member 69. The pressed-out portion 72 is between a pair of side flanges 74 which have bolt-receiving openings, corresponding to the openings 62 in the anchor plate, so that the bolts which attach the anchor plate to the steering knuckle also holds the bracket in place. It will be observed that the connection between the lower flanges 74 of the bracket and the portion 61 of the anchor plate is substantially in the median plane of the brake shoes. An unequal thrust upon the anchor pin will not result in a bending moment tending to twist the anchor pin with respect to its bearing supports at either end. Therefore this form of the invention is an improvement over prior constructions in the same manner as the first-described embodiment.

I also show in Figures 7 to 10, inclusive, a construction in which the housing for the anchor pin is made integral with the anchor plate. It is desirable to form the anchor plate in such a manner that it will be rigid and resist movement of the housing for the anchor pin with respect to the points at which the anchor plate is carried by the support, such as the steering knuckle of a front wheel. Therefore, the housing for the anchor pin should be as close as possible to a point of support for the anchor plate.

In Figures 7 and 8 I show an anchor plate 80 having a peripheral depression 81 which overlaps the edge of the brake drum. The anchor plate has an inwardly pressed portion 82 provided with bolt-receiving openings 83 for securing the anchor plate to a support. Intermediate the portions 81—82 the anchor plate has an inwardly pressed-out annular portion 84 which forms a support and a housing for an anchor pin and has lateral slotted openings 85 to receive the ends of a pair of brake shoes 86, as shown in Figure 7. The anchor plate also includes a pair of lateral pressed-out portions 87 forming side walls of the slotted opening 85. The inner portion of the annular housing 84 is joined to the central portion 82 by a wall 88 while the outer portion is similarly joined thereto by a vertical wall 89 and an inclined wall 90. Thus there will be a recess on the outer side of the anchor plate between the side walls 91 immediately beneath the anchor pin.

In Figure 7 a spring 92 is shown extending between an opening 93 and the pair of brake shoes, the central portion 94 of which is received in slots 95 of the side walls 91. The coil spring 96 on one side of the portion of the anchor plate through which the spring extends is stronger than the portion 97 on the opposite side. In order to close the opening on the outside of the anchor plate immediately beneath the anchor pin and prevent dirt getting into the interior of the brake, I show a felt piece 98 which has a cut 99 to receive the straight portion 94 of the spring and the felt piece is therefore held in place by the spring. It will be obvious that this construction of the anchor plate provides a rigid housing for the anchor pin and prevents bending thrust upon the bearing pin, in the same manner as the previous constructions.

In Figure 9 similar reference numerals are applied so far as possible. The principal difference is that the slots, which receive the ends of the brake shoes, are wider than in Figure 8 since this form does not include the lateral pressed-out portions 87, as shown in Figure 8; also, the spring 92 is somewhat lower than the arrangement shown in Figure 7.

In Figure 10 the construction is quite similar to Figure 8 except that the central portion 94 of the spring does not extend through the anchor plate but engages the inner side of the wall 88 so that in this form, a pressed-metal stamping piece 100 may be inserted in the recess below the pin instead of the felt piece shown in Figure 8. The piece 100 may be suitably welded to the anchor plate and form a continuation of the annular housing 84.

I claim:

1. A vehicle brake comprising, in combination with a brake drum, a pair of brake shoes, a fixed anchor plate, a bracket fixed to said anchor plate at a plane substantially in the median plane of said brake shoes, said bracket and anchor plate forming a housing receiving the adjacent ends of said brake shoes, a slidable wedge-shaped anchor pin received in said housing between the ends of said brake shoes for adjusting the same and means exterior of said anchor plate for moving said wedge shaped anchor pin to adjust said brake shoes.

2. A vehicle brake comprising in combination, a brake drum, a pair of brake shoes adapted to be moved into engagement with said brake drum, a fixed anchor plate, a bracket secured to said anchor plate, an anchor pin received between the ends of said brake shoes, said anchor plate and bracket forming supporting bearing portions for said pin on the opposite sides of the median plane of said brake shoes and said anchor plate and bracket having cooperating pressed-out portions for locking the parts in engagement.

3. In a brake, an anchor plate, a bracket secured thereto and forming a housing together with the anchor plate for a brake shoe anchor pin, said bracket and anchor plate having cooperating engaging portions angular to the vertical plane of the anchor plate for resisting thrusts upon the pin and bracket.

4. In a brake construction, a pair of brake shoes, a backing plate having a central portion inwardly pressed to a plane substantially in the median plane of the brake shoes and having a pressed out anchor bearing, a bracket secured to the pressed-in central portion of the backing plate, said bracket having a pressed-out anchor bearing, an anchor pin supported by the anchor bearing portions of said backing plate and bracket, and said anchor plate and bracket having inter-engaging pressed portions for receiving the thrust upon said anchor pin due to circumferential reaction of said brake shoes.

5. In a brake construction, a pair of brake shoes, a backing plate having a central portion inwardly pressed to a plane substantially in the median plane of the brake shoes, the inwardly pressed portion of said backing plate having an outwardly pressed anchor bearing, and having a raised portion on its inner side extending substantially radial of the backing plate above and below the pressed out anchor bearing, a bracket secured to said backing plate formed to overlap said raised portion whereby the securement of said bracket to said backing plate is relieved from circumferential shear due to the overlapping association of the bracket with the backing plate, said bracket having an outwardly pressed anchor bearing, an anchor pin supported by the anchor bearing portions of said backing plate and said bracket, said backing plate and bracket having additional cooperating pressed-out portions for admitting the ends of the brake shoes into thrust engagement with said anchor pin.

6. In a brake construction, a rotatable brake drum, a pair of brake shoes within the brake drum, a backing plate closing the inner side of said brake drum, said backing plate being depressed on its outer side to form a central attachment portion lying substantially in the median plane of said brake shoes, said backing plate having an anchor bearing portion outwardly pressed therefrom, a bracket adapted for securement to the inner side of said backing plate, said bracket having a pressed anchor bearing portion extending substantially coaxial in opposite direction from the anchor bearing portion of said backing plate, said bracket being secured to said backing plate at points above and below said anchor pin and means in addition thereto for resisting separation of said bracket from said backing plate due to circumferential thrust of said brake shoes.

Signed at Chicago, Illinois, this 12th day of March, 1931.

EDWIN R. EVANS.